(12) United States Patent
Kronsteiner et al.

(10) Patent No.: US 10,703,198 B2
(45) Date of Patent: Jul. 7, 2020

(54) KART AND DRIVE ASSEMBLY FOR A KART

(71) Applicants: BRP-ROTAX GMBH & CO. KG, Gunskirchen (AT); I.E.T. S.p.A., Montecastelli (IT)

(72) Inventors: Dominik Kronsteiner, Vorchdorf (AT); Heinz Kusel, Pennewang (AT); Stefan Gruber, Roitham (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 15/881,912

(22) Filed: Jan. 29, 2018

(65) Prior Publication Data

US 2018/0215255 A1 Aug. 2, 2018

Related U.S. Application Data

(60) Provisional application No. 62/452,422, filed on Jan. 31, 2017.

(51) Int. Cl.
*B60K 17/04* (2006.01)
*B60K 17/08* (2006.01)
(Continued)

(52) U.S. Cl.
CPC ............... *B60K 17/04* (2013.01); *B60K 1/00* (2013.01); *B60K 17/08* (2013.01); *B60K 17/22* (2013.01);
(Continued)

(58) Field of Classification Search
CPC ... B60G 2300/26; B60K 17/04; F16H 57/021; F16H 57/031
See application file for complete search history.

(56) References Cited

U.S. PATENT DOCUMENTS

| 3,533,484 | A |   | 10/1970 | Garfield |           |
|-----------|---|---|---------|----------|-----------|
| 4,042,055 | A | * | 8/1977  | Ward     | B60K 1/04 |
|           |   |   |         |          | 180/60    |

(Continued)

FOREIGN PATENT DOCUMENTS

| DE | 102011084031 A1 | 4/2013 |
| ES | 2453017 B1 | 11/2017 |
| FR | 2302000 A7 | 9/1976 |

OTHER PUBLICATIONS

European Search Report issued from the EPO in connection with the European Patent Application 18154095.6; Vasilis Hassiotis.
(Continued)

*Primary Examiner* — Brian L Swenson
(74) *Attorney, Agent, or Firm* — BCF LLP

(57) ABSTRACT

A drive assembly for a kart, and a kart including the assembly is disclosed. The assembly includes an electric motor including an output shaft; an assembly housing surrounding the motor, the housing defining an aperture; an intermediate shaft rotatably disposed within the assembly housing; a driving gear removably disposed on the output shaft within the housing; a reduction gear removably disposed on the intermediate shaft within the housing; and a panel removably connected to the housing for selectively covering the aperture, the driving gear and the reduction gear being removable from the motor and the housing via the aperture when the panel is removed from the housing, the panel, the driving gear, and the reduction gear being disposed above a maximum level of transmission oil contained within the housing when the motor is not operating. A method of changing a kart transmission ratio is also disclosed.

10 Claims, 11 Drawing Sheets

(51) Int. Cl.
    *F16H 57/04*     (2010.01)
    *F16H 57/02*     (2012.01)
    *B60K 1/00*     (2006.01)
    *B60K 17/22*     (2006.01)
    *F16H 1/20*     (2006.01)
    *F16H 57/021*     (2012.01)
    *F16H 57/023*     (2012.01)
    *F16H 57/031*     (2012.01)
    *B60L 15/00*     (2006.01)
    *B62D 21/18*     (2006.01)

(52) U.S. Cl.
    CPC ............ *F16H 1/20* (2013.01); *F16H 57/02* (2013.01); *F16H 57/021* (2013.01); *F16H 57/023* (2013.01); *F16H 57/031* (2013.01); *F16H 57/04* (2013.01); *F16H 57/0452* (2013.01); *F16H 57/0476* (2013.01); *B60G 2300/26* (2013.01); *B60K 2001/001* (2013.01); *B60L 15/007* (2013.01); *B60Y 2200/114* (2013.01); *B62D 21/183* (2013.01); *F16H 2057/02034* (2013.01); *F16H 2057/02043* (2013.01); *F16H 2057/02073* (2013.01)

(56) References Cited

U.S. PATENT DOCUMENTS

| | | | |
|---|---|---|---|
| 4,283,968 A | | 8/1981 | Kalns |
| 5,685,384 A | * | 11/1997 | Kobilan ................. A63G 25/00 180/65.1 |
| 6,170,596 B1 | * | 1/2001 | Triarsi ................... B60K 20/06 180/291 |
| 6,717,281 B1 | * | 4/2004 | Brandon ................. B60W 10/04 290/400 |
| 7,000,727 B2 | | 2/2006 | Korenjak et al. |
| 9,605,745 B1 | * | 3/2017 | Burns ................... F16H 57/031 |
| 10,253,868 B2 | * | 4/2019 | Kiyokami .......... F16H 57/0439 |
| 2002/0017418 A1 | * | 2/2002 | Korenjack ............. B60K 17/04 180/291 |
| 2013/0025950 A1 | | 1/2013 | Brandon |
| 2014/0033862 A1 | | 2/2014 | Tryens et al. |
| 2014/0187366 A1 | * | 7/2014 | Kouma ................. F16H 57/031 474/8 |
| 2018/0216712 A1 | * | 8/2018 | Forrester, Jr. ............ F16H 1/16 |
| 2018/0273101 A1 | * | 9/2018 | Martin ................. B62D 21/183 |
| 2018/0297401 A1 | * | 10/2018 | Liu ....................... F16H 57/021 |

OTHER PUBLICATIONS

English Machine translation of DE102011084031A1 retrieved from http://translationportal.epo.org/ on Sep. 18, 2018.

English Machine translation of FR2302000A7 retrieved from http://translationportal.epo.org/ on Sep. 18, 2018.

English Machine translation of 2453017B1 retrieved from http://translationportal.epo.org/ on Sep. 18, 2018.

* cited by examiner

કart and drive assembly for a kart

KART AND DRIVE ASSEMBLY FOR A KART

CROSS-REFERENCE

The present application claims priority to U.S. Provisional Patent Application No. 62/452,422, entitled "Kart and Drive Assembly for a Kart", filed Jan. 31, 2017, the entirety of which is incorporated herein by reference.

TECHNICAL FIELD

The present technology relates generally to a drive assembly for a kart, and to a kart with a drive assembly with an electric motor.

BACKGROUND

Karts are motor vehicles that are used for leisure and sporting activities. In karts, a chain is often used to transmit power from the engine to the rear-wheel drive shaft; this chain is routed around an engine pinion and a sprocket that is mounted on the rear-wheel drive shaft.

Karts are often operated at high speeds, modern kart engines running at speeds of up to 21,000 rpm, which places extremely high stresses on the chain drive system. These can be linked to high rates of wear, a rapid loss of efficiency, short service life, and excessive noise. The outcome is that the chain, which is costly in and of itself, as well as the sprocket, have to be replaced at very short intervals.

FR 2302000 A proposes a drive system for karts where the chain drive has been replaced by a direct-drive/spur gearing system in order to eliminate the problems referred to above. The solution is not without its own disadvantages, including for example, the fact that complete encapsulation of the transmission, in order to prevent the egress of lubricating oil and the ingress of dirt, is difficult due to the separation of the engine from the transmission.

U.S. Pat. No. 7,000,727 B2 also proposes drive systems with a direct-drive/spur gearing system in order to eliminate at least some of the problems described above at least in part, in part by providing a housing to encapsulate the engine and transmission. Depending on the situation in which the kart is being used, a user of the kart may wish to have more torque (higher gear ratio), or alternatively may desire a higher top speed (lower gear ratio). Thus this solution has its own disadvantages, as the housing must still provide an opening in order to change the drive gear ratio of the spur gearing system. The arrangement of the gears substantially forward of the drive shaft and engine makes it difficult to change or replace gears while avoiding transmission oil leaking from the housing.

There is therefore a desire for a kart with a drive system which addresses the above described drawbacks.

SUMMARY

It is an object of the present to ameliorate at least some of the inconveniences present in the prior art.

According to an aspect of the present technology, there is provided a drive assembly for a kart, comprising an electric motor including an output shaft; an assembly housing at least partially surrounding the electric motor, the assembly housing defining an aperture; an intermediate shaft rotatably disposed within the assembly housing; a driving gear removably disposed on the output shaft within the assembly housing; a reduction gear removably disposed on the intermediate shaft within the assembly housing, the reduction gear being driven by the driving gear; and a panel removably connected to the assembly housing for selectively covering the aperture, the driving gear and the reduction gear being removable from the motor and the assembly housing via the aperture when the panel is removed from the assembly housing, the panel, the driving gear, and the reduction gear being disposed above a maximum level of transmission oil contained within the assembly housing when the electric motor is not operating.

In some implementations of the present technology, the panel further comprises a first bearing housing for receiving an end of the intermediate shaft; and a second bearing housing for receiving an end of the output shaft, the first and second bearing housings being disposed on an interior side of the panel.

In some implementations of the present technology, the panel further comprises a first ball bearing disposed in the first bearing housing, the intermediate shaft being received in the first ball bearing when the panel is connected to the assembly housing; and a second ball bearing disposed in the second bearing housing, the output shaft being received in the second ball bearing when the panel is connected to the assembly housing.

In some implementations of the present technology, the drive assembly further comprises a rear wheel drive shaft operatively connected to the intermediate shaft; and wherein the rear wheel drive shaft rotates within and extends through the motor housing, and the panel, the driving gear, and the reduction gear are removable from the assembly housing without disconnecting or removing the rear wheel drive shaft from the assembly housing.

In some implementations of the present technology, the panel is disposed at least partially above the rear wheel drive shaft.

In some implementations of the present technology, a distance between the output shaft and the intermediate shaft is fixed.

In some implementations of the present technology, the drive assembly further comprises a power inverter operatively connected to the electric motor.

According to another aspect of the present technology, there is provided a kart, comprising a frame; a seat connected to the frame; a drive assembly connecting to the frame, the drive assembly comprising an electric motor including an output shaft, the electric motor being connected to the frame behind the seat; an assembly housing at least partially surrounding the electric motor, the assembly housing defining an aperture; an intermediate shaft rotatably disposed within the assembly housing; a driving gear disposed on the output shaft within the assembly housing; a reduction gear disposed on the intermediate shaft within the assembly housing, the reduction gear being driven by to the driving gear; and a panel removably connected to the assembly housing for selectively covering the aperture, the panel, the driving gear, and the reduction gear being disposed above a maximum level of transmission oil contained within the assembly housing when the motor is not operating; the driving gear and the reduction gear being removable from the motor and the assembly housing via the aperture when the panel is removed from the assembly housing; a rear wheel drive shaft operatively connected to the intermediate shaft; a rear axle operatively connected to the rear wheel drive shaft; a pair of rear wheels connected to the rear axle; a front axle rotatably connected to the frame; and a pair of front wheels connected to the front axle.

In some implementations of the present technology, the panel further comprises a first bearing housing for receiving an end of the intermediate shaft; and a second bearing housing for receiving an end of the output shaft, the first and second bearing housings being disposed on an interior side of the panel.

In some implementations of the present technology, the panel further comprises a first ball bearing disposed in the first bearing housing, the intermediate shaft being received in the first ball bearing when the panel is connected to the assembly housing; and a second ball bearing disposed in the second bearing housing, the output shaft being received in the second ball bearing when the panel is connected to the assembly housing.

In some implementations of the present technology, the panel is disposed at least partially above the rear wheel drive shaft.

In some implementations of the present technology, a distance between the output shaft and the intermediate shaft is fixed.

In some implementations of the present technology, the kart further comprises a power inverter operatively connected to the electric motor.

According to yet another aspect of the present technology, there is provided a method of changing transmission ratio for a kart powered by an electric motor, comprising removing a panel from a housing at least partially surrounding the electric motor, the panel selectively covering an aperture defined by the housing, the aperture and the panel being disposed above a maximum level of transmission oil contained within the assembly housing when the motor is not operating, the panel being removable from the housing without removal of any one of a wheel of the kart and a shaft of the motor, the panel being removable without lifting the kart to prevent spilling of the transmission oil from within the assembly housing; releasing and removing a driving gear from an output shaft of the electric motor; releasing and removing a reduction gear from an intermediate shaft; connecting a replacement driving gear to the output shaft; connecting a replacement reduction gear to the intermediate shaft; and reconnecting the panel to the housing, a gear ratio of the driving gear to the reduction gear being different from a gear ratio of the replacement driving gear to the replacement reduction gear.

For purposes of this application, terms related to spatial orientation such as forwardly, rearward, upwardly, downwardly, left, and right, are as they would normally be understood by an operator of the vehicle riding thereon in a normal driving position. Terms related to spatial orientation when describing or referring to components or sub-assemblies of the vehicle, separately from the vehicle, should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
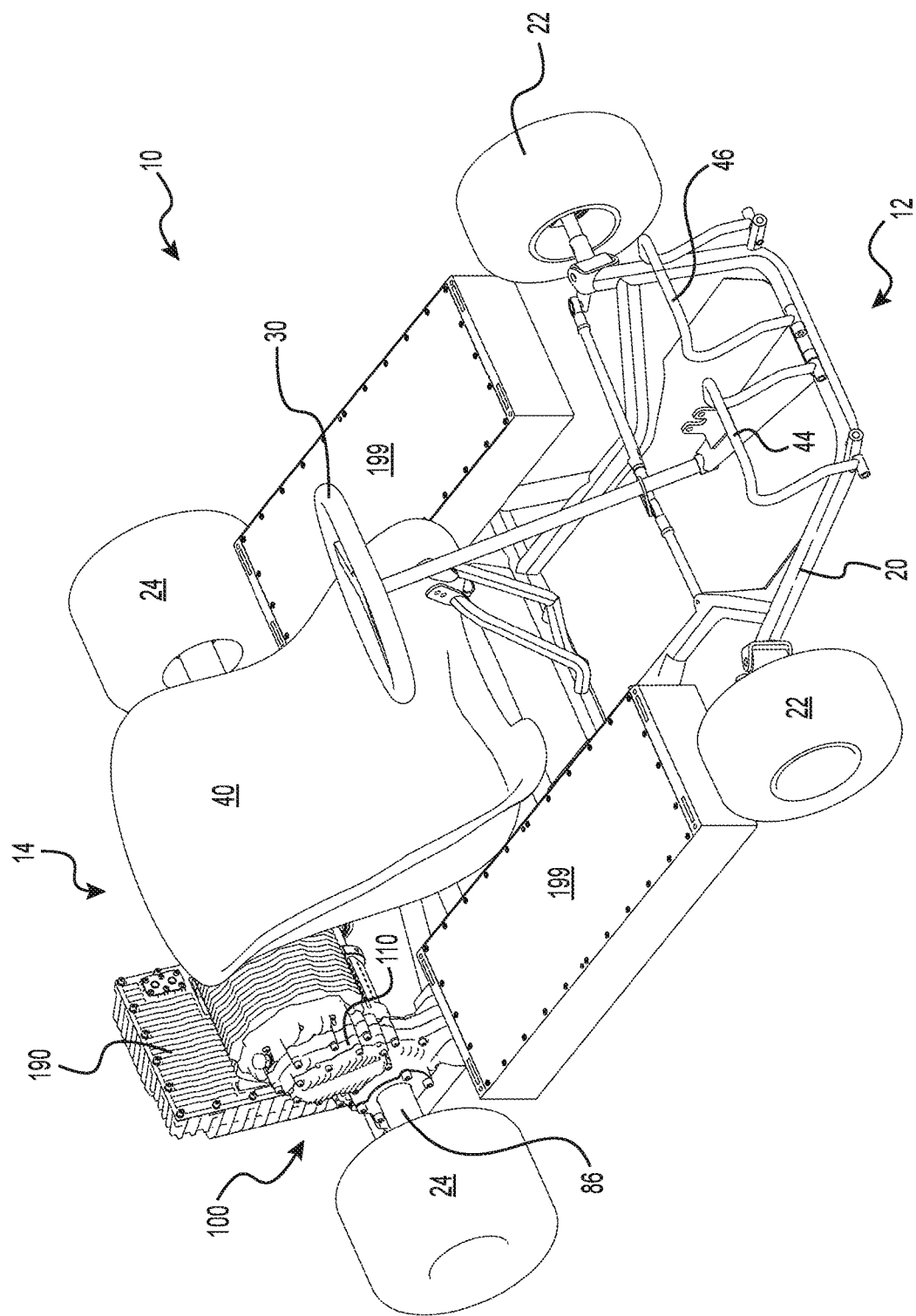
FIG. 1 is a top, front, and right side perspective view of a kart.
Figure 2:
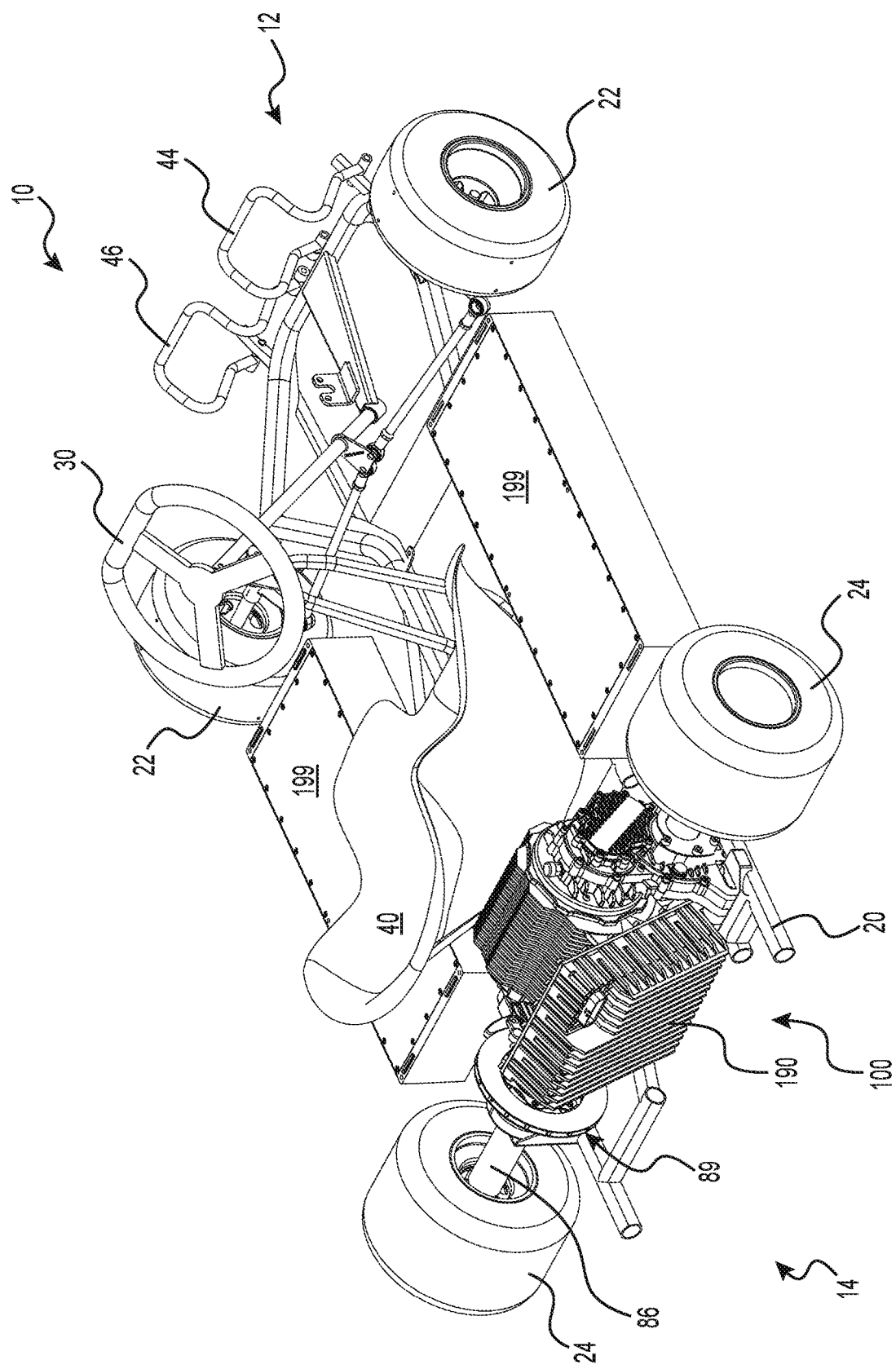
FIG. 2 is a top, rear, and right side perspective view of the kart of FIG. 1.

FIGS. 1 and 2 show the general construction of a vehicle 10, generally referred to as a kart 10. Some implementations of the kart 10 may be referred to as a go-kart. It should be understood that the kart 10 could have a construction other than the one described below.

The kart 10 has a chassis 20 composed at least in part of a tubular structure, also known as a frame 20. The frame 20 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described above could be cast or otherwise formed as a single component. It is also contemplated that the frame 20 could have more or less members and brackets than illustrated in FIGS. 1 and 2, depending on the type of materials used, the required strength and rigidity of the frame 20 and the weight of the components attached to the frame 20 for example.

A pair of front wheels 22 are rotatably connected to the frame 20. A steering wheel 30 is operatively connected to the front wheels 22 for steering the vehicle 10. A driver's seat 40 is connected to the frame 20 rearward of the steering wheel 30. In a front portion 12 of the kart 10, in front of the seat 40, there is an accelerator pedal 44 and a brake pedal 46.

Disposed in a rear portion 14 of the frame 20, rearward of the driver seat 40, is a drive assembly 100 for driving the kart 10. The drive assembly 100 includes an electric motor 105 (see FIG. 9). A rear-wheel drive shaft 86 extends through and is supported by the drive assembly 100. A pair of rear wheels 24 are connected to and driven by the rear-wheel drive shaft 86. The electric motor 105 is operatively connected to the rear-wheel drive shaft 86 to drive the rear wheels 24. It is contemplated that the kart 10 could include a twin-engine drive system (with two drive assemblies 100 behind and to either side of the driver's seat 40). In such an implementation, two rear-wheel drive shafts 86 would be installed on both sides of the kart 10, in the two drive assemblies 100.

Further details relating to the drive assembly 100 and the manner in which power from the electric motor 105 is transferred to the rear-wheel drive shaft 86 will be described below.

Two battery packs 199 supply electric power to the electric motor 105. One battery pack 199 is connected to the frame 20 on each of the left and right of the driver's seat 40. Each battery 199 is electrically connected to a power inverter 190 by a battery management system (BMS) module (not shown). Each BMS module is integrated in its corresponding battery 199. It is contemplated that the BMS modules could be separate from the battery 199. The power inverter 190 converts the direct current (DC) from the batteries 199 to alternating current (AC) and supplies the AC to the electric motor 105.

A brake 89 is disposed around the rear-wheel drive shaft 86 for braking the vehicle 10 (see FIG. 2). The brake 89 is operatively connected to and activated by the brake pedal 46. It is contemplated that the vehicle 10 could have more than one brake 89.

In FIGS. 3 to 9, the drive assembly 100 is illustrated isolated from the remaining components of the kart 10. With reference to these Figures, the drive assembly 100 will now be described in more detail.

The drive assembly 100 includes an assembly housing 110 surrounding or partially surrounding components of the drive assembly 100. The electric motor 105 included in the drive assembly 100 is disposed within the housing 110. In the present implementation, the electric motor 105 is an AC motor. More specifically, the electric motor 105 is a permanent magnet synchronous motor (PMSM). It is contemplated that other types of electric motors could be used. The housing 110 includes cooling fins 112 to aid in cooling the electric motor 105. It is contemplated that the housing 110 could include more or less cooling fins 112. It is also contemplated that the cooling fins 112 could be larger or smaller than those illustrated for the present implementation.

Figure 3:
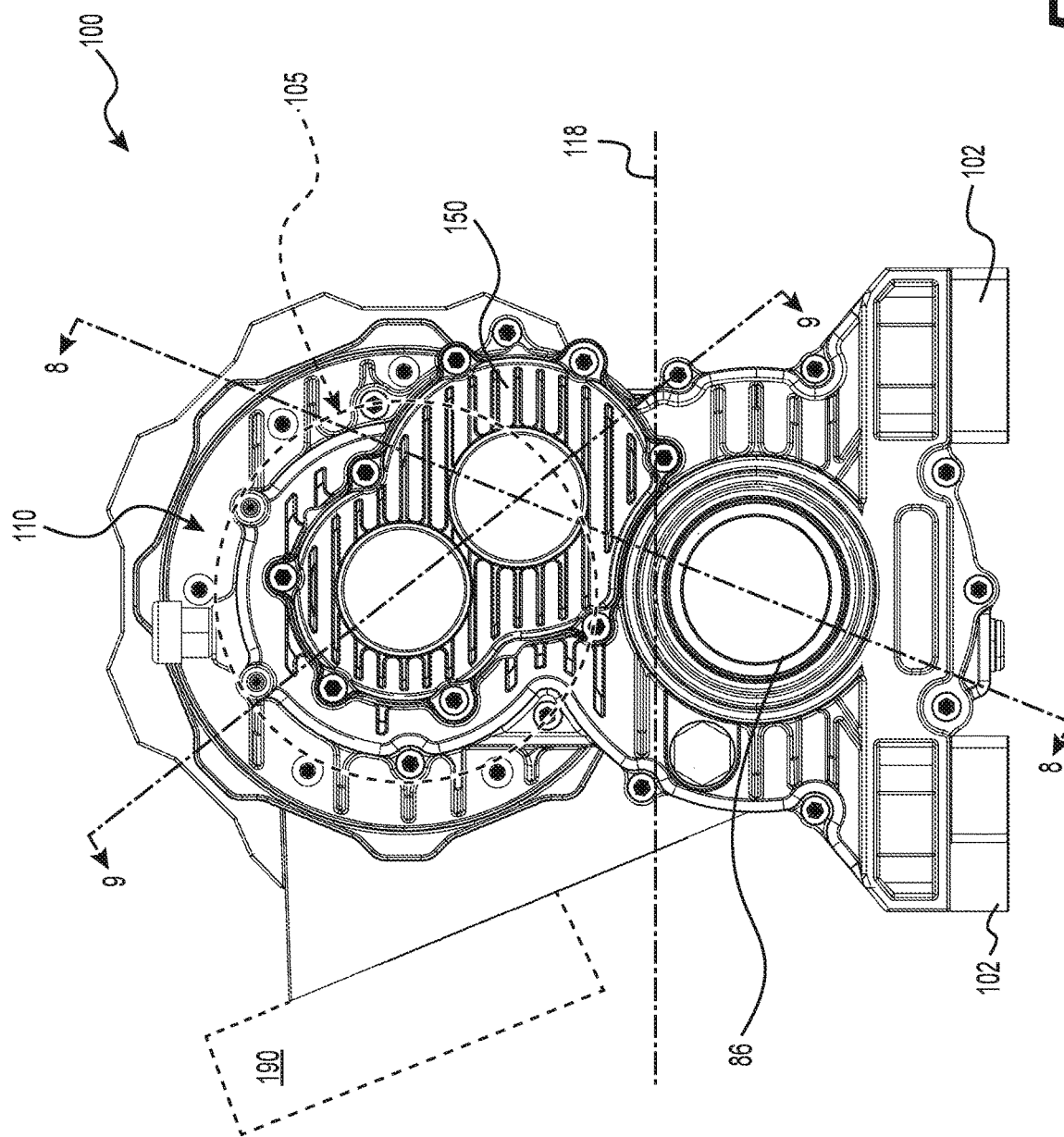
FIG. 3 is a right side elevation view of a drive assembly of the kart of FIG. 1.
Figure 4:
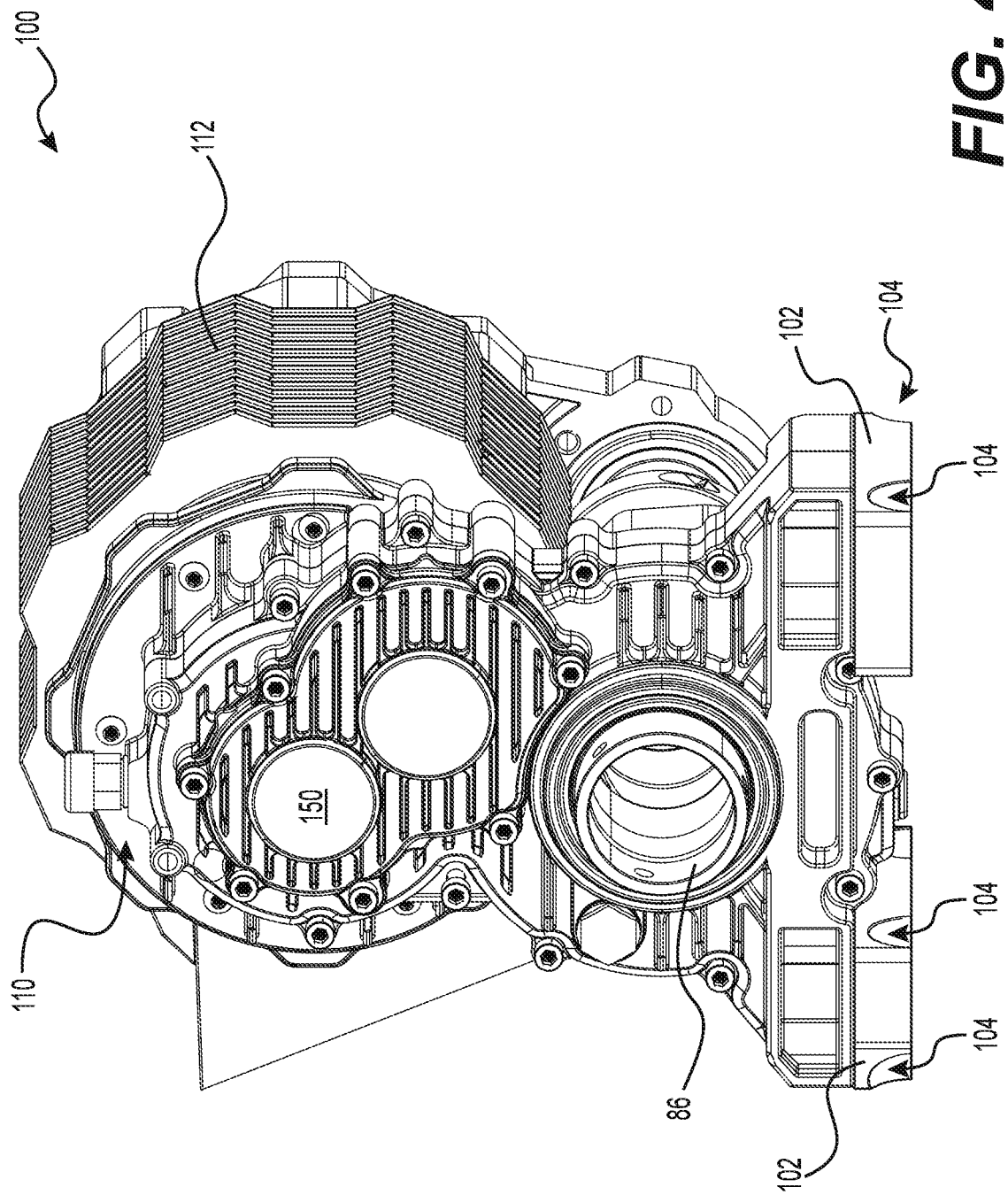
FIG. 4 is a front, right perspective view of the drive assembly of FIG. 3.
Figure 5:
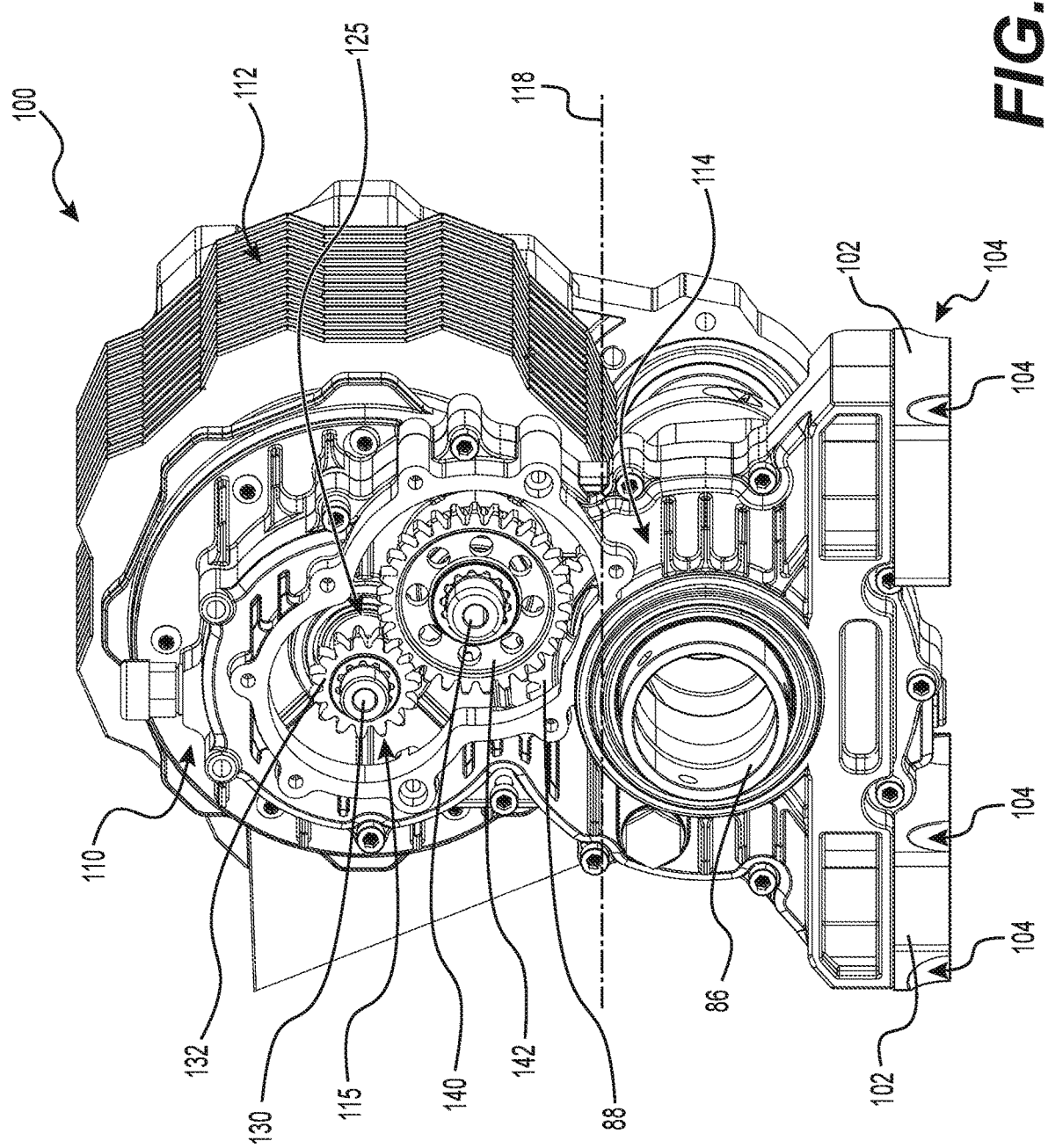
FIG. 5 is the front, right perspective view of the drive assembly of FIG. 3, with a panel of the drive assembly having been removed.

The drive assembly 100 includes the power inverter 190 that is operatively connected to the motor 105. As illustrated in FIGS. 1 to 3, the power inverter 190 is disposed outside the housing 110, and electrically connects to the motor 105 therethrough. It is contemplated that the housing 110 could additionally surround all or portions of the power inverter 190, depending on the implementation.

The drive assembly 100 includes two connecting portions 102 extending downward from the housing 110 for securing the drive assembly 100 to the frame 20 of the kart 10. Each connecting portion 102 includes several recesses 104 for receiving portions of the frame 20. The kart 10 includes two other corresponding connecting portions (not shown) which bolt to the connecting portions 102 from an underside of the frame portion, in order to surround the frame portions and hold the drive assembly in place.

Figure 9:
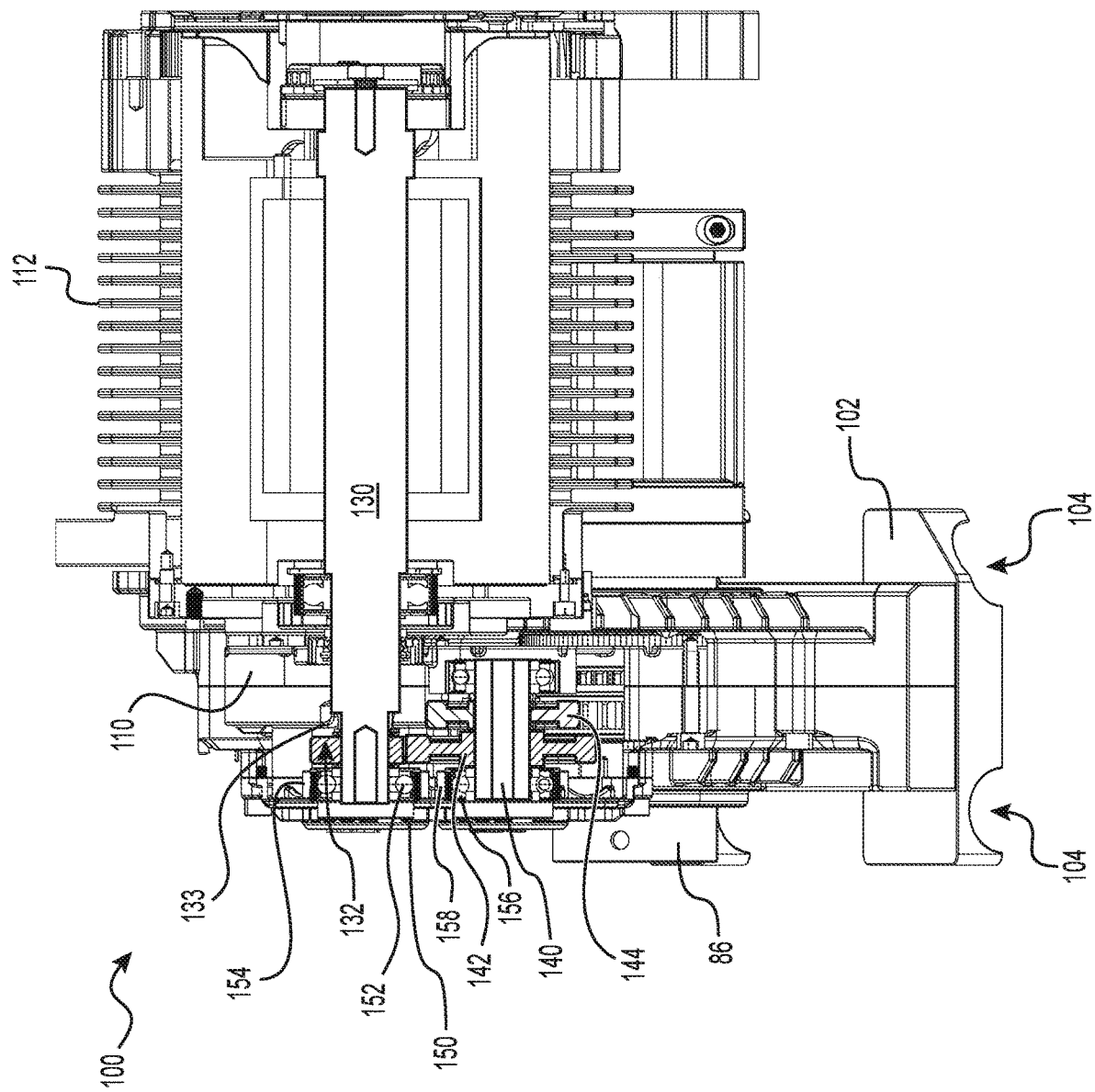
FIG. 9 is a cross-sectional view of the drive assembly of FIG. 3, taken along line 9-9 of FIG. 3.

As seen in FIG. 9, an output shaft 130, also referred to as a drive shaft 130, extends partially through and out from the electric motor 105. Torque imparted by the motor 105 on the output shaft 130 is transmitted to the rear-wheel drive shaft 86 through a two-stage spur-type reduction gearing 125 (see FIG. 5). For reasons discussed below, the two-stage gearing 125 is generally vertically arranged, although details on the exact vertical and horizontal positions of the gears of the gearing 125 will vary by implementation.

An intermediate shaft 140 for supporting the two intermediate gears connecting the motor 105 to the rear-wheel drive shaft 86 in the two-stage gearing 125 is also included within the assembly housing 110. The intermediate shaft 140 is disposed below and forward of the output shaft 130. It is contemplated that the intermediate shaft 140 could be disposed directly below or below and rearward of the output shaft 130, depending on the implementation.

Figure 7:
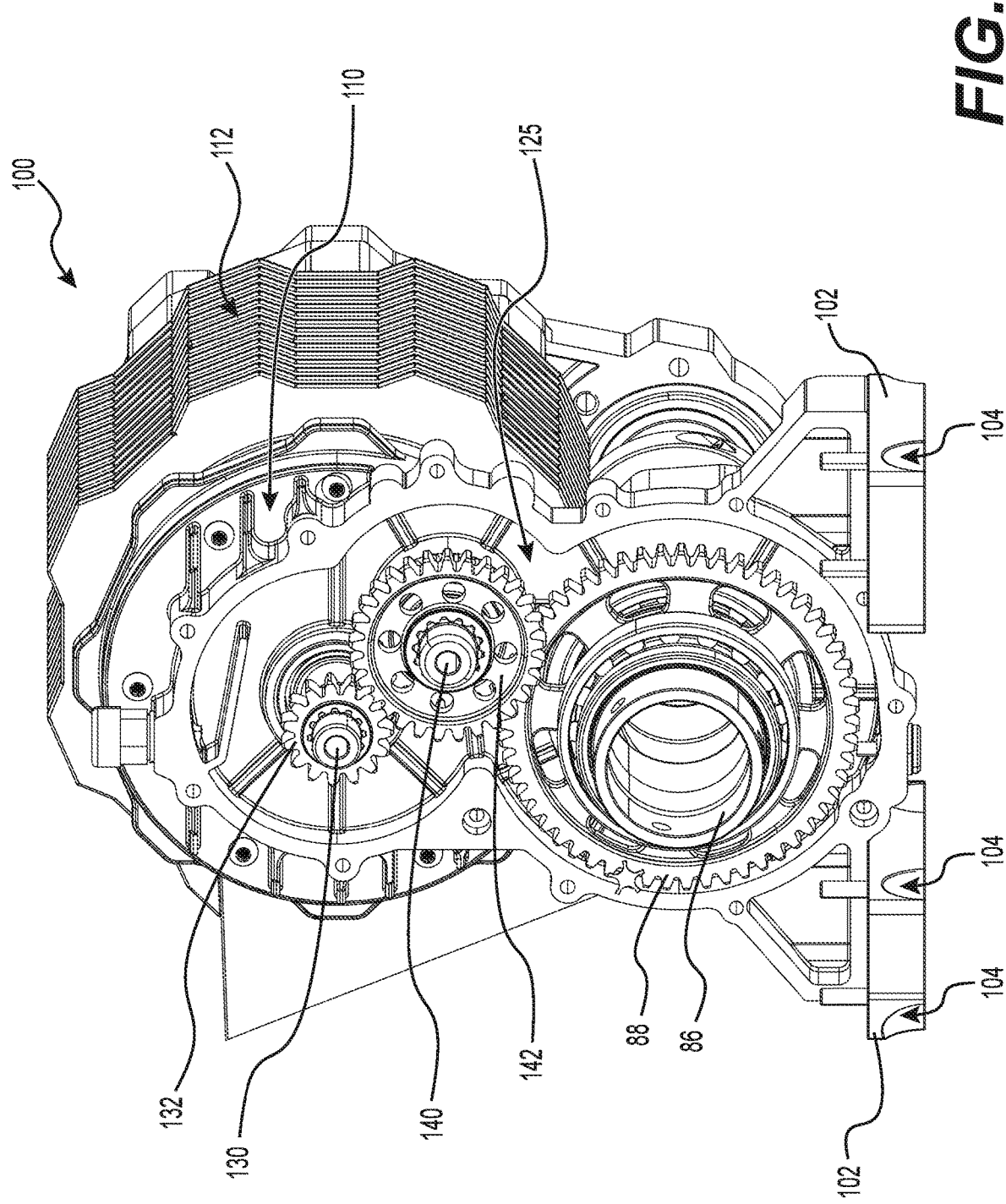
FIG. 7 is the front, right perspective view of the drive assembly of FIG. 3, with the panel and a right side housing portion of the drive assembly having been removed.
Figure 8:
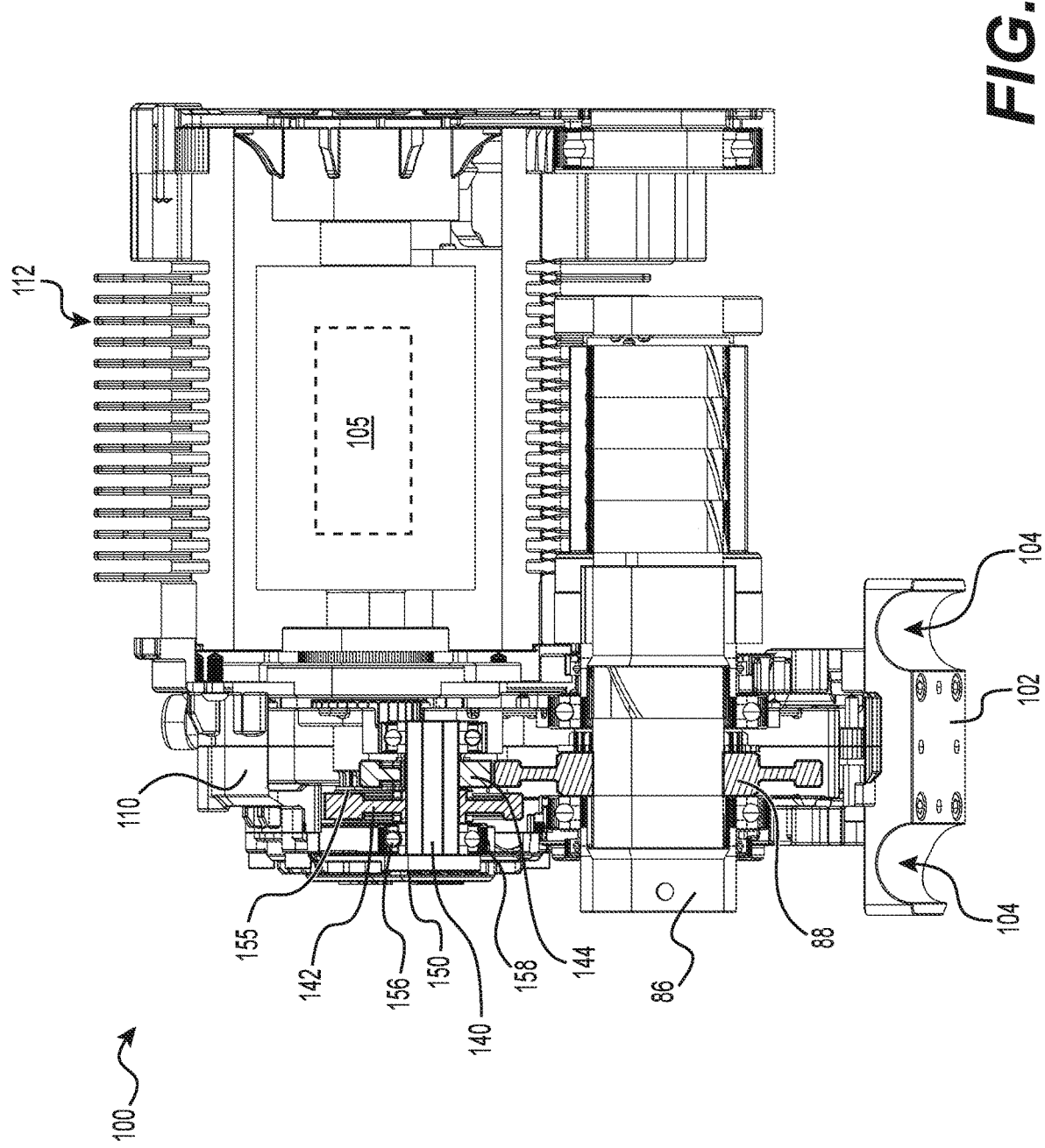
FIG. 8 is a cross-sectional view of the drive assembly of FIG. 3, taken along line 8-8 of FIG. 3.

As best seen in FIG. 7, the first stage of the gearing 125 includes a driving gear 132 and a reduction gear 142. The driving gear 132 is removably disposed on the output shaft 130. The output shaft 130 and the driving gear 132 have complementary splines to ensure that the shaft and gear 130, 132 rotate together, while also allowing the gear 132 to be slid off the shaft 130 when desired. Axial movement of the driving gear 132 along the output shaft 130 is prevented by a retaining ring 133 on a motor side of the gear 132, and a ball bearing 152 on an outward side (see FIG. 9). Both the output shaft 130 and the driving gear 132 are enclosed by the assembly housing 110. The reduction gear 142 is removably disposed on the intermediate shaft 140. The intermediate shaft 140 and the reduction gear 142 have complementary splines to ensure that the shaft and gear 140, 142 rotate together, while also allowing the gear 142 to be slid off the shaft 140 when desired. On a motor side of the reduction gear 142, axial movement of the reduction gear 142 along the intermediate shaft 140 is impeded by a retaining ring 155 axially fixed to the intermediate shaft 140. A ball bearing 156 on an outward side (see FIG. 9) prevents axial movement outward of the reduction gear 142. Both the intermediate shaft 140 and the reduction gear 142 are disposed within the assembly housing 110.

The second stage of the gearing 125 includes a transfer gear 144 and a drive shaft gear 88. The transfer gear 144 is disposed on the intermediate shaft 140, leftward from the reduction gear 142 (see FIG. 8). The drive shaft gear 88 is disposed on the rear-wheel drive shaft 86, as can best be seen in FIG. 7, where a right side housing portion 114 of the assembly housing 100 has been removed. It should be noted that the portion 114 is removed to access components surrounding the rear-wheel drive shaft 86 and the drive shaft gear 88, but need not be removed to access the removable gears 132, 142. As the intermediate shaft 140 is driven by the driving gear 132 via the reduction gear 142, the transfer gear 144 drives the rear-wheel drive shaft 86 via the drive shaft gear 88.

As will be described in more detail below, the transmission ratio can be changed be removing the gears 132, 142 and reconnecting replacement gears. It should be noted that only the first stage of the two-stage gearing 125 need be changed in order to change the transmission ratio. As such, there is no need to change the drive shaft gear 88, avoiding the need for removing one of the rear wheels 24 or other intervening elements of the kart 10 when modifying the transmission ratio.

A lubricating oil bath (also called transmission oil) for the rear-wheel drive shaft 86 is included within the housing 110 to provide lubrication to components inside the housing 110, including the rear-wheel drive shaft 86. The assembly housing 110 is designed as a closed unit so as to prevent the egress of lubricating oil and the ingress of dirt. When the drive assembly 100 is not operating and the kart 10 is on level ground, the lubricating oil settles within the housing 110 and has a maximum resting oil level 118 (see FIGS. 3 and 5). During operation of the kart 10 and/or the motor 105, however, portions of the lubrication oil may be jostled and splashed up into the assembly housing 110, above the maximum level 118.

In order to provide access to the gearing 125, an aperture 115 is defined by the assembly housing 110 on the right side of the drive assembly 100. The drive assembly 100 further includes a removable panel 150 for selectively covering the aperture 115. The panel 150 creates a seal around the aperture 115 when fully connected to the housing 110, preventing transmission oil from getting out and contaminants from getting in through the aperture 115. The panel 150 is shown connected to the housing 110 and covering the aperture 115 in FIGS. 3 and 4. The aperture can best be seen in FIG. 5, where the panel 150 has been removed. It is contemplated that the drive assembly 100 could be disposed in a mirror-image arrangement from the present implementation, the aperture 115 and the panel 150 being disposed on the left side.

As described above, the two-stage gearing 125 is disposed in a generally vertical arrangement. As such, the removable gears 132, 142 are disposed generally above the rear-wheel drive shaft 86, and above the maximum resting oil level 118. The aperture 115 to access the removable gears 132, 142, as well as the panel 150 covering it, are disposed above the maximum level 118 of the oil. As such, the transmission ratio (also called the reduction ratio) of the drive assembly 100 can be changed while the kart 10 is in a normal operating orientation (i.e. with all four wheels 22, 24 still connected to the kart 10 and on level ground) and without generally having to take additional precautions to prevent transmission oil from spilling out of the drive assembly 100. One implementation of a method 200 for changing the transmission/reduction ratio will be described in more detail further below.

Figure 6:
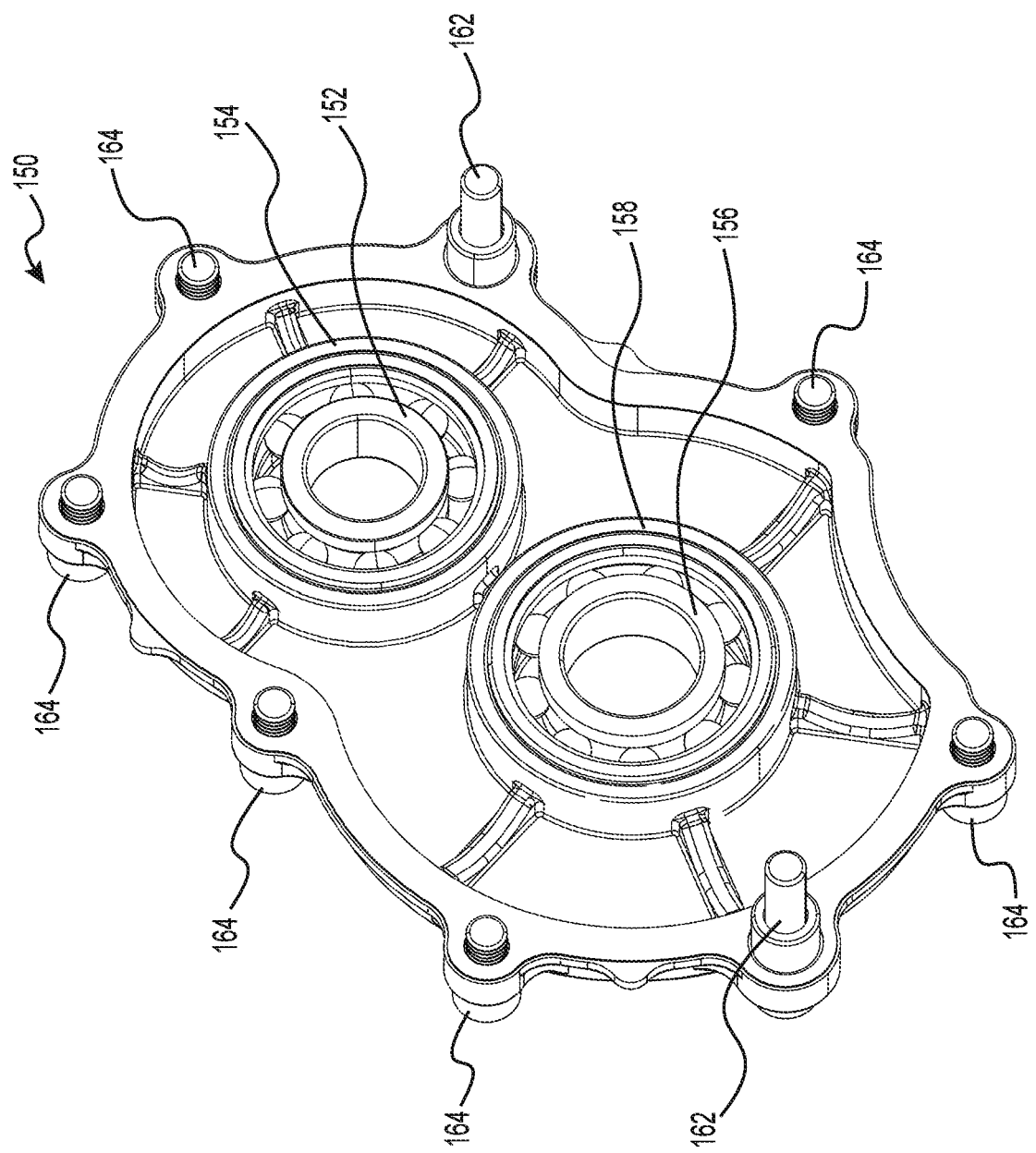
FIG. 6 is a front, left perspective view of the panel of the drive assembly of FIG. 3, shown in isolation.

The removable panel 150 will now be described in more detail with reference to FIG. 6. The panel 150 includes the ball bearing 152 in a bearing housing 154 on its interior side for receiving a right end of the output shaft 130. The panel 150 also includes a ball bearing 156 in a bearing housing 158 on its interior side for receiving a right end of the intermediate shaft 140. The shafts 130, 140 are press fit into the panel 150 when the panel 150 is pushed into place over the aperture 115. It is contemplated that the panel 150 could include different mechanisms for rotatably holding the ends of the shafts 130, 140.

The panel 150 includes two alignment pegs 162 for aligning the panel 150 with the aperture 115. It is contemplated that the panel 150 could include more or less alignment pegs 162. The panel 150 is connected to the housing 110 by six bolts 164. It is contemplated the panel 150 could connect to the housing 110 by more or less bolts 164. It is also contemplated that the panel 150 could be removably connected to the housing 110 using different means, including for example, different fasteners or hinges allowing the panel 150 to be pivoted open.

Figure 10:
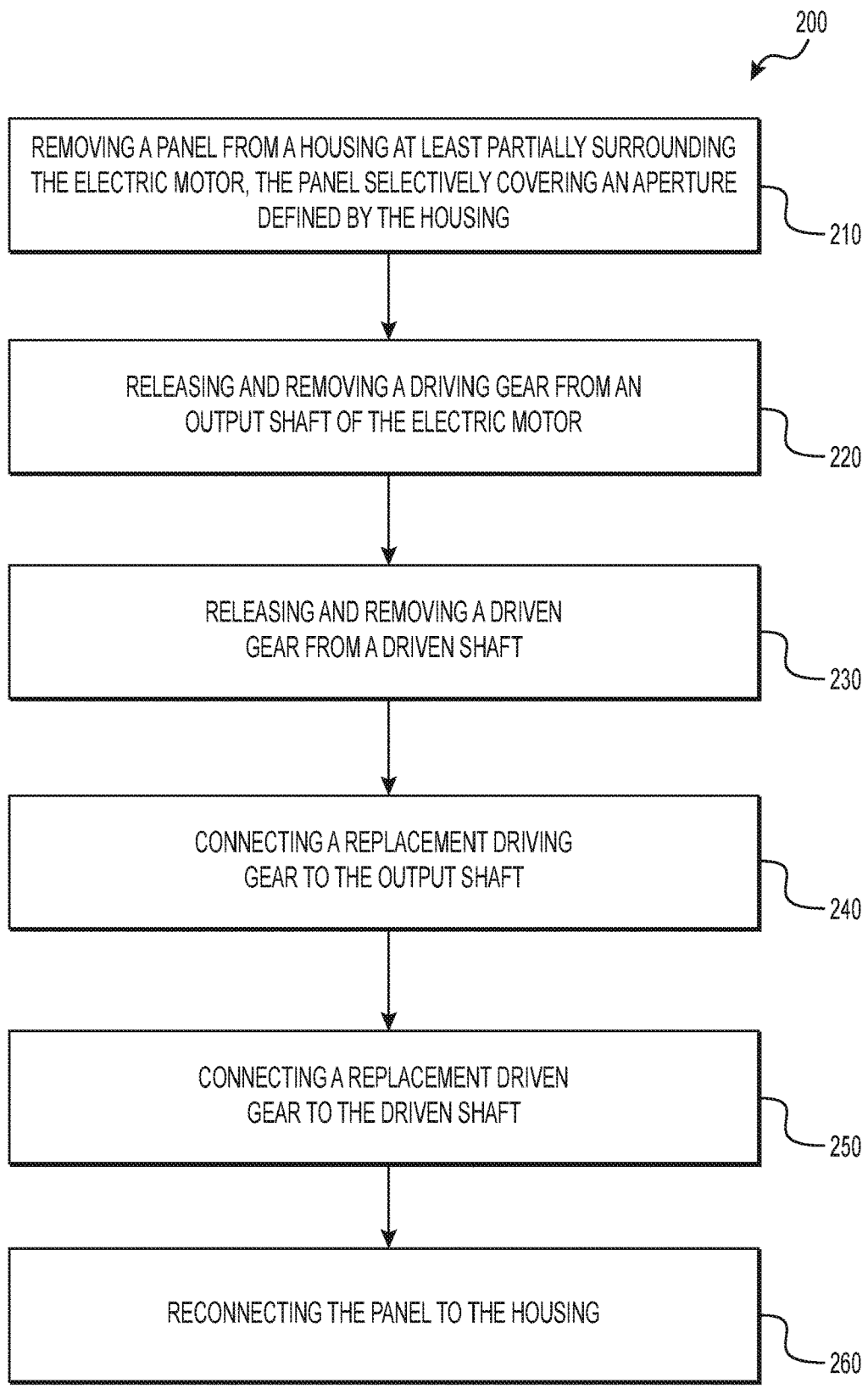
FIG. 10 is a flow-chart representing a method of changing transmission gears of the drive assembly of FIG. 3.

A method 200 of changing the transmission ratio for the kart 10 will now be described with reference to FIG. 10. The method 200, as described herein, should be performed when the motor 105 is not operating. It is contemplated that the method 200 could include further steps, including but not limited to steps to increase ease and/or safety of the method 200.

The method 200 generally begins at step 210 with removing the panel 150 from the housing 110 to expose the aperture 115, as well as the gears 132, 142. This is achieved by removing the bolts 164. As noted above, the aperture 115 and the panel 150 are disposed above the maximum resting level 118 of the transmission oil contained within the assembly housing 110 (when the motor 105 is not operating). As such, the panel 150 is removable from the housing 110 without having to lift or tilt the kart 10 to prevent spilling of the lubricating oil from within the assembly housing 110. Because the panel 150 does not encircle the rear-wheel drive shaft 86, the panel is removable from the assembly housing 110 without removal of the rear wheel 24 of the kart 10, nor the shaft 86. The panel 150 is also removable from the assembly housing 110 without removal of the shafts 130, 140 because the shafts 130, 140 do not extend through the panel 150, and the shaft ends are simply press fitted into the ball bearings 152, 156 on the interior of the panel 150.

The method 200 continues at step 220 with releasing and removing the driving gear 132 from the output shaft 130 of the electric motor 105. At step 230, the method 200 continues with releasing and removing the reduction gear 142 from the intermediate shaft 140. The gears 132, 142 are removed from their respective shafts 130, 140 by sliding the gears 132, 142 off the shafts 130, 140, as the ball bearings 152, 154 no longer prevent axial movement of the gears 132, 142. It is contemplated that a different mechanism from connecting and releasing the gears 132, 142 to/from their respective shafts 130, 140 could be implemented.

Figure 11:
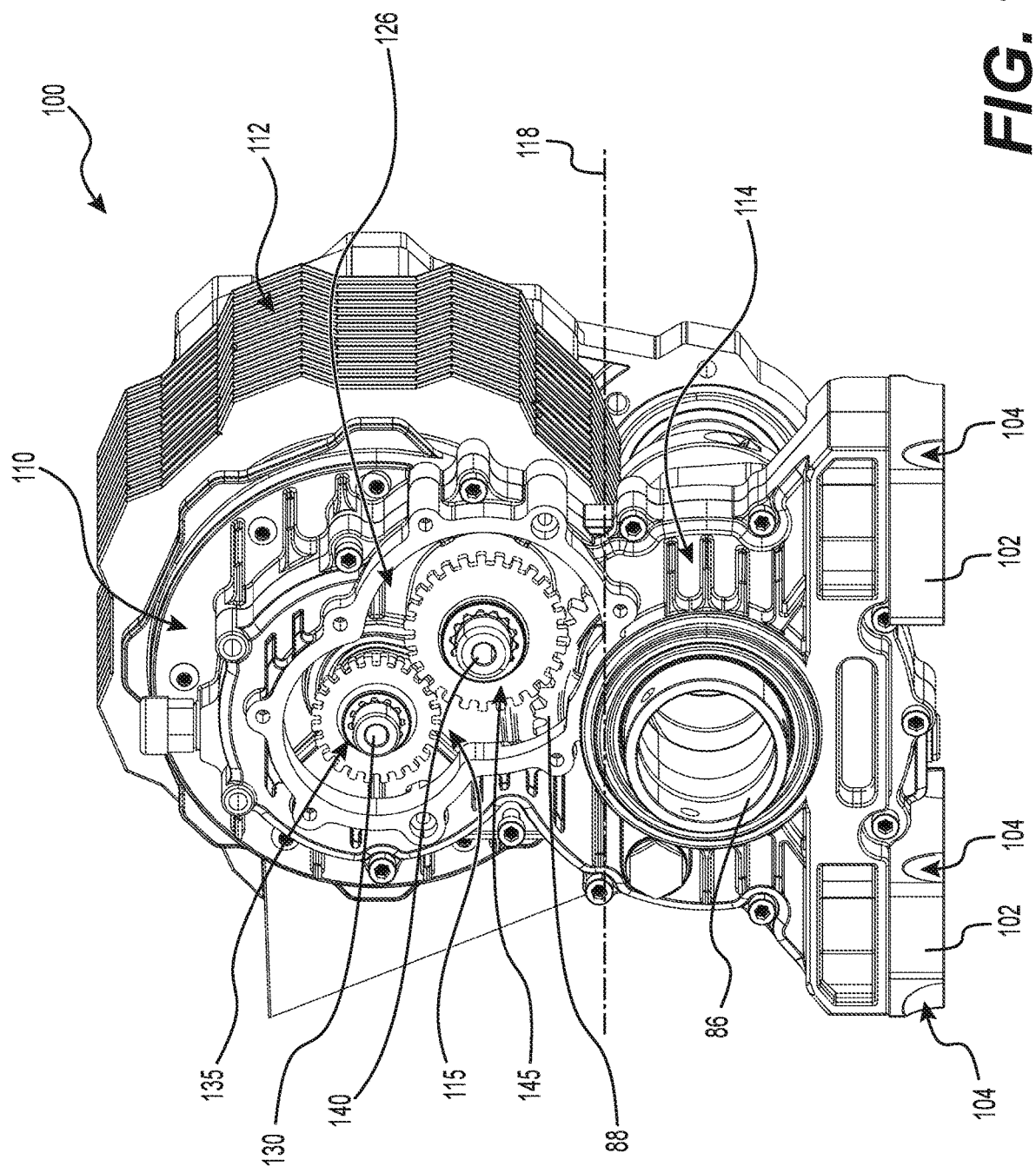
FIG. 11 is the front, right perspective view of the drive assembly of FIG. 3, with the panel of the drive assembly having been removed and two replacement gears having been installed.

The method 200 then continues with step 240, where a replacement driving gear 135 is connected to the output shaft 130. At step 250, the method 200 continues with connecting a replacement reduction gear 145 to the intermediate shaft 140. The replacement gears 135, 145 are illustrated in FIG. 11, where the replacement driving gear 135 has more teeth than the previous driving gear 132 and the replacement reduction gear 145 has less teeth than the previous reduction gear 142. As such, the drive assembly 100 with a transmission gearing 126 with the replacement gears 135, 145 will have a higher top speed (but less torque) than the drive assembly 100 with the transmission gearing 125. It should be noted that in order to change the transmission ratio, a gear ratio of the driving gear 132 to the reduction gear 142 needs to be different from a gear ratio of the replacement driving gear 135 to the replacement reduction gear 145. In one implementation, it is contemplated that the replacement driving gear 135 could be the reduction gear 142 and the replacement reduction gear 145 could be the driving gear 132 (depending on the ratio of the gears 132, 142). In such an implementation, after performing steps 240 and 250, the reduction gear 142 is connected on the output shaft 130 and the driving gear 132 is connected on the intermediate shaft 140.

It is contemplated that the steps 220, 230, 240, and 250 could be performed in a different order. It is contemplated, for example, the steps 220 and 230 could be performed in the reverse order. It is also contemplated that the step 220 and then the step 240 could be performed before either of the steps 230 and 250. Similarly, it is contemplated that the step 230 and then the step 250 could be performed before either of the steps 220 and 240.

Once the steps 220, 230, 240, and 250 have been performed, the method 200 generally terminates with the panel 150 being reconnected to the assembly housing 110 at step 260 as described above.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A drive assembly for a kart, comprising:
   an electric motor including an output shaft;
   an assembly housing at least partially surrounding the electric motor, the assembly housing defining an aperture;
   an intermediate shaft rotatably disposed within the assembly housing;
   a driving gear removably disposed on the output shaft within the assembly housing;
   a reduction gear removably disposed on the intermediate shaft within the assembly housing, the reduction gear being driven by the driving gear; and
   a panel removably connected to the assembly housing for selectively covering the aperture, the panel comprising:
      a first bearing housing for receiving an end of the intermediate shaft; and
      a second bearing housing for receiving an end of the output shaft,
   the first and second bearing housings being disposed on an interior side of the panel,
   the driving gear and the reduction gear being removable from the motor and the assembly housing via the aperture when the panel is removed from the assembly housing,
   the panel, the driving gear, and the reduction gear being disposed above a maximum level of transmission oil contained within the assembly housing when the electric motor is not operating.

2. The drive assembly of claim 1, wherein the panel further comprises:
   a first ball bearing disposed in the first bearing housing, the intermediate shaft being received in the first ball bearing when the panel is connected to the assembly housing; and
   a second ball bearing disposed in the second bearing housing, the output shaft being received in the second ball bearing when the panel is connected to the assembly housing.

3. A drive assembly for a kart, comprising:
   an electric motor including an output shaft;
   an assembly housing at least partially surrounding the electric motor, the assembly housing defining an aperture;
   an intermediate shaft rotatably disposed within the assembly housing;
   a driving gear removably disposed on the output shaft within the assembly housing;
   a reduction gear removably disposed on the intermediate shaft within the assembly housing, the reduction gear being driven by the driving gear;
   a panel removably connected to the assembly housing for selectively covering the aperture,
   the driving gear and the reduction gear being removable from the motor and the assembly housing via the aperture when the panel is removed from the assembly housing,
   the panel, the driving gear, and the reduction gear being disposed above a maximum level of transmission oil contained within the assembly housing when the electric motor is not operating; and
   a rear wheel drive shaft operatively connected to the intermediate shaft,
   the rear wheel drive shaft rotating within and extending through the motor housing, and
   the panel, the driving gear, and the reduction gear being removable from the assembly housing without disconnecting or removing the rear wheel drive shaft from the assembly housing.

4. The drive assembly of claim 3, wherein the panel is disposed at least partially above the rear wheel drive shaft.

5. The drive assembly of claim 3, wherein a distance between the output shaft and the intermediate shaft is fixed.

6. A kart, comprising:
   a frame;
   a seat connected to the frame;
   a drive assembly connecting to the frame, the drive assembly comprising:
      an electric motor including an output shaft, the electric motor being connected to the frame behind the seat;
      an assembly housing at least partially surrounding the electric motor, the assembly housing defining an aperture;
      an intermediate shaft rotatably disposed within the assembly housing;
      a driving gear disposed on the output shaft within the assembly housing;
      a reduction gear disposed on the intermediate shaft within the assembly housing, the reduction gear being driven by to the driving gear; and
      a panel removably connected to the assembly housing for selectively covering the aperture, the panel further comprises:
         a first bearing housing for receiving an end of the intermediate shaft; and
         a second bearing housing for receiving an end of the output shaft,
      the first and second bearing housings being disposed on an interior side of the panel,
      the panel, the driving gear, and the reduction gear being disposed above a maximum level of transmission oil contained within the assembly housing when the motor is not operating;
      the driving gear and the reduction gear being removable from the motor and the assembly housing via the aperture when the panel is removed from the assembly housing;
   a rear wheel drive shaft operatively connected to the intermediate shaft;
   a rear axle operatively connected to the rear wheel drive shaft;
   a pair of rear wheels connected to the rear axle;
   a front axle rotatably connected to the frame; and
   a pair of front wheels connected to the front axle.

7. The kart of claim 6, wherein the panel further comprises:
   a first ball bearing disposed in the first bearing housing, the intermediate shaft being received in the first ball bearing when the panel is connected to the assembly housing; and
   a second ball bearing disposed in the second bearing housing, the output shaft being received in the second ball bearing when the panel is connected to the assembly housing.

8. The kart of claim 6, wherein the panel is disposed at least partially above the rear wheel drive shaft.

9. The kart of claim 6, wherein a distance between the output shaft and the intermediate shaft is fixed.

10. A method of changing transmission ratio for a kart powered by an electric motor, comprising:

removing a panel from a housing at least partially surrounding the electric motor, the panel selectively covering an aperture defined by the housing, the aperture and the panel being disposed above a maximum level of transmission oil contained within the assembly housing when the motor is not operating, the panel being removable from the housing without removal of any one of a wheel of the kart and a shaft of the motor, the panel being removable without lifting the kart to prevent spilling of the transmission oil from within the assembly housing, the panel having first and second bearing housings disposed on an interior side of the panel;

removing an end of an intermediate shaft from the first bearing housing by removing the panel from the housing at least partially surrounding the electric motor;

removing an end of an output shaft of the electric motor from the second bearing housing by removing the panel from the housing at least partially surrounding the electric motor;

releasing and removing a driving gear from the output shaft of the electric motor;

releasing and removing a reduction gear from the intermediate shaft;

connecting a replacement driving gear to the output shaft;

connecting a replacement reduction gear to the intermediate shaft;

reconnecting the panel to the housing, a gear ratio of the driving gear to the reduction gear being different from a gear ratio of the replacement driving gear to the replacement reduction gear.

* * * * *